March 1, 1960 G. A. LYON 2,926,957
WHEEL COVER
Filed Sept. 15, 1955
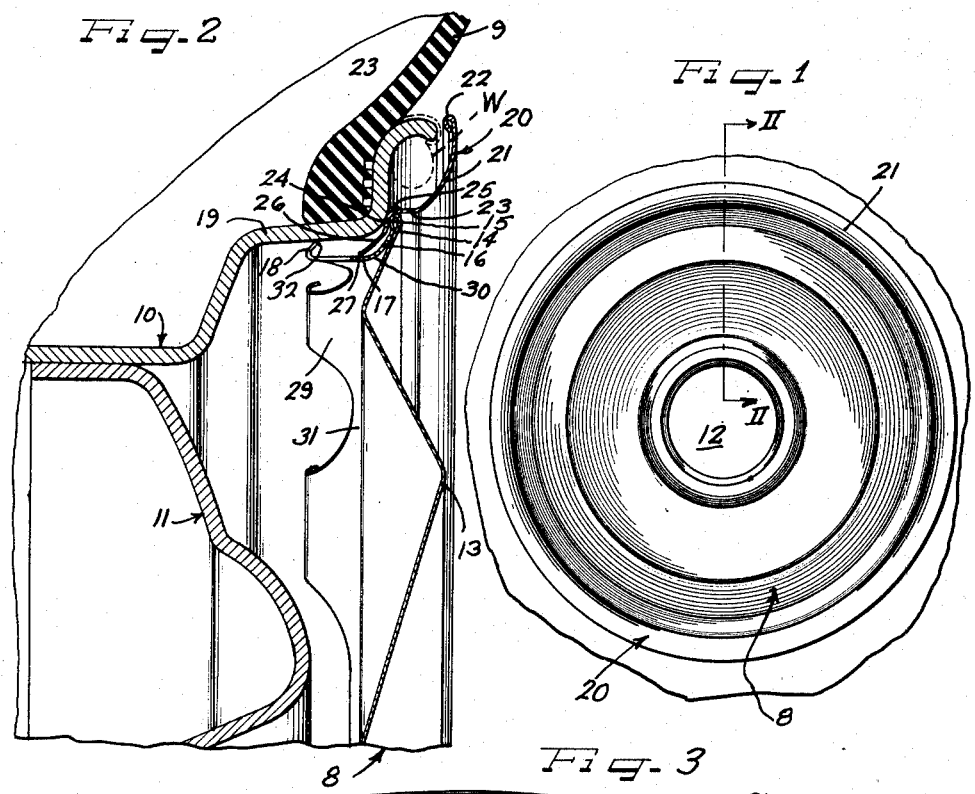
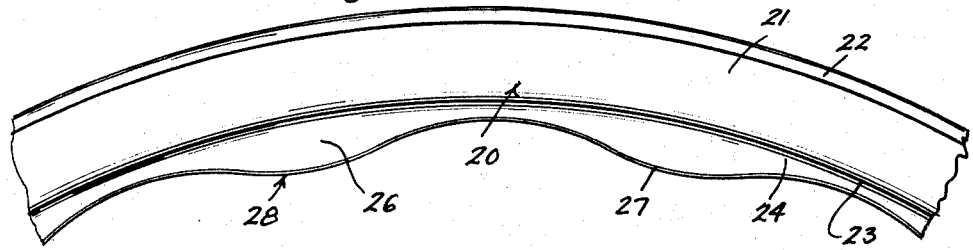
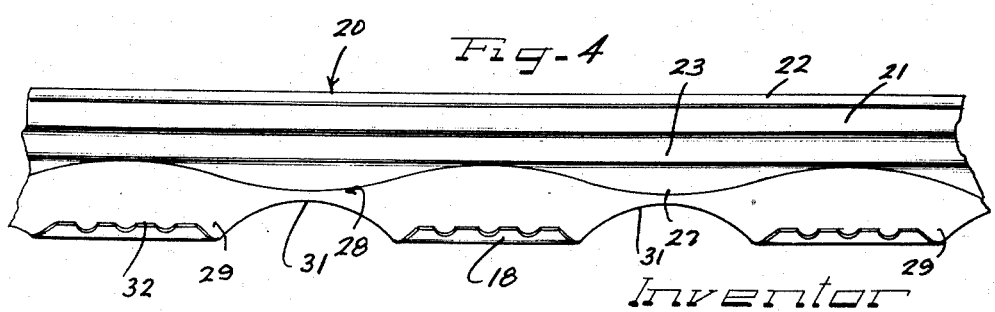
Inventor
GEORGE ALBERT LYON

United States Patent Office 2,926,957
Patented Mar. 1, 1960

2,926,957

WHEEL COVER

George Albert Lyon, Detroit, Mich.

Application September 15, 1955, Serial No. 534,535

14 Claims. (Cl. 301—37)

This invention relates generally to a wheel structure and more specifically to a multi-part wheel cover.

In the automobile industry there is a never ending quest for highly ornamental wheel covers. The instant cover construction includes an outer annular ring member which is adapted to cooperate with the inner cover member so that the tire rim is substantially hidden in its entirety. Another purpose of the instant ring member is to cover unsightly wheel balancing weights carried on the outer periphery of the tire rim. It will be appreciated that the retaining means for maintaining the inner cover member on the wheel is the subject of my patent, 2,624,634, issued January 6, 1953.

An object of this invention is to provide a highly ornamental multi-part cover construction.

Still another object of this invention is to provide an outer annular ring construction capable of retaining cooperation with an inner cover member.

Still a further object of this invention is to provide a novel ring construction capable of overlying the tire rim and concealing wheel balancing weights.

Yet another object of this invention is to provide a cover construction which lends itself to economical manufacture on a large production basis.

According to the general features of this invention, there is provided in a wheel structure including a stepped multi-flanged tire rim possessed of a radially inwardly facing rim flange as well as an annular rim shoulder disposed axially outwardly of the rim flange, a circular cover member having an outer marginal cover area confronting the annular rim shoulder and retaining cover structure on the underside of the cover member cooperable with the radially inwardly facing rim flange to sustain the cover member in removable assembly on the wheel, and a radially outer ring member overlies the tire rim radially outwardly of the outer marginal cover area and with the ring member having an inner marginal ring area underlapping the outer marginal cover area and with the outer marginal cover area through the action of the retaining cover structure clamping the inner underlapping marginal ring area against the annular rim shoulder and thereby sustaining the ring member in assembly on the wheel.

According to other general features of this invention there is provided in an annular ring for disposition at generally the outer margin of an annular cover member having shoulder means on the inner side of the cover member adjacent its outer periphery, the ring including a generally radially outwardly extending portion connected at generally its radially inner end to a seat portion and terminating in a resilient terminal portion provided with a resilient gripping edge, the seat portion being capable of receiving the outer margin of the cover member with said gripping edge engageable along the radially outer surface of the shoulder means thereby securely maintaining the ring and cover member in unitary relation.

Another feature of this invention relates to the gripping edge being undulated thereby being capable of engagement with the shoulder means at predetermined intervals about its periphery thereof.

Other objects and features of this invention will more fully appear from the following detailed description taken in conjunction with the accompanying drawing which illustrates a single embodiment thereof and in which:

Figure 1 is a fragmentary side view of a wheel equipped with my novel cover construction;

Figure 2 is an enlarged fragmentary cross sectional view taken on substantially the line II—II of Figure 1 looking in the direction indicated by the arrow;

Figure 3 is an enlarged fragmentary rear elevation of my novel ring; and

Figure 4 is an enlarged fragmentary plan view of the engaged inner and outer cover members.

As shown on the drawings:

My novel wheel cover 8 is cooperable with a conventional type of automobile wheel which includes the usual tire 9 which may be either of the tube or tubeless type. The tire 9 is carried in the customary way upon a multi-flanged drop center type of tire rim 10. This rim 10 is comprised of a series of rim flanges including intermediate, radial and terminal rim flanges. The rim is in turn supported in the usual way upon a central dished metallic body part 11 having a central bolt-on flange (not shown) by means of which the wheel can be attached by bolts or cap screws (not shown) to a part on an axle of a wheel.

Cooperable with this conventional wheel is the metallic circular wheel cover 8 which is preferably made from very thin steel sheet or strip. Excellent results may be obtained by stamping the main body of the cover from stainless steel sheet or the like. The inner cover member 8 includes a central crown 12 (Figure 1) having an intermediate annular peak 13 and an outer margin 14.

The outer margin 14 is undertuned into an annular bead 15 which is joined to a radial and then an axial annular portion 16 and 17 terminating in retaining fingers 18.

The retaining fingers are the subject of my patent, 2,624,634, issued January 6, 1953. As will be best noted from Figure 2, the fingers 18 are cooperable with a generally axial flange 19 on the tire rim capable of tensioned cover retaining engagement therewith.

Cooperable with the cover 8 is my novel annular ring 20 which may be made from any suitable material, but may, similarly as the cover 8, also be made from very thin steel sheet or strip by stamping or other similar techniques.

Ring 20 includes a radial convex annular portion 21 which terminates at one end in an undertuned pry-off edge 22. Connected at the outer end of portion 21 is an annular axial portion 23 which is in turn connected to a generally radial portion 24; the portions 23 and 24 together defining a seat 25 for purposes later described.

Radial portion 24 terminates in a generally radially and axially inwardly inclined resilient portion 26 which terminates in an edge 27 of an irregular or undulated configuration (Figures 3 and 4). By virtue of the undulated configuration, edge 27 acts only as a gripping edge at spaced intervals where the undulation reaches generally its greatest radial and axial inward penetration indicated generally at 28 (Figures 3 and 4).

Cover retaining means 18 include circumferentially spaced sets of gripping fingers 29 which are joined on the inner side the cover member adjacent its outer periphery by an annular L-shaped simulating portion 30 which is joined to pry-off edge 15. The L-shaped annular portion 30 defines an annular shoulder against which ring edge 27 grips in assembly as will be apparent from the following discussion. Each of the fingers 29 is of a tapered reinforced construction with the result that there is an arcuate cut out 31 between each of the fingers 29.

Assembly of cover 8 with ring 20 may be affected by centering cover 8 with the inner opening defined by ring 20 and axially aligning undulated gripping edge portion 28 with cover cut out 31 so that the ring gripping edge will move axially free of gripping edges 32 on finger 29.

As the ring and cover are moved closer and closer together, resilient gripping edge 27 engages the L-shaped annular portion 30 with the result that bead 15 is engaged in seat 25 under tension thereby holding the ring and cover in unitary relation.

When the cover is then assembled on the wheel, with retaining means 18 engaging axial flange 19, the junction of annular portions 23 and 24 defining seat 25 engages against the tire rim 10 thereby serving to augment the connection between the ring and cover to minimize any likelihood that the engaged ring and cover will become disengaged.

It will be appreciated that the connection between the ring and cover is augmented by the spring force of the engagement of the cover with the wheel. In other words, the force of the engagement between the retaining means 18 and the tire rim 10 serves to further strengthen the connection between the cover and ring.

The instant ring construction is highly advantageous since the outer portion of the tire rim 10 may be completely concealed to hide unsightly wheel weights W located on the rim as shown in Figure 2.

As will be best seen in Figure 2, it will be noted that the convex or bowed configuration of annular portion 21 along with the provision of curbed pry-off bead or edge 22 serves to reinforce the seat 25.

Removal of the cover may be effected by inserting a suitable pry-off tool under edge 24 and subsequently under seat 25 and upon a twisting force the cover may be ejected from the rim.

It will be understood that modifications and variations may be effected without departing from the scope of the novel concepts of the present invention.

I claim as my invention:

1. In a wheel structure including a tire rim and body parts with the tire rim having intermediate and terminal rim flanges with an annular rim shoulder therebetween, an inner cover member for disposition generally over the body part having shoulder means disposed on the underside of the cover adjacent its outer margin confronting the intermediate rim flange and cover retaining means carried on the cover member on its underside cooperable with the wheel for retaining the cover on the wheel, and an outer annular ring cover member for overlying and concealing the tire rim including an annular seat confronting the annular rim shoulder between the intermediate and terminal rim flanges for receiving therein the outer margin of said inner cover member, said seat having extending therefrom a resilient portion terminating in an edge for edgewise tensioned engagement upon said shoulder means and thereby urging said cover margin in tensioned bottomed relation in said seat.

2. In a wheel structure including tire rim and body parts with the tire rim having intermediate and terminal rim flanges with an annular rim shoulder therebetween, an inner cover member for disposition generally over the body part having shoulder means disposed on the underside of the cover adjacent its outer margin confronting the intermediate rim flange and cover retaining means carried on the cover member on its underside cooperable with the wheel for retaining the cover on the wheel, and an outer annular ring cover member for overlying and concealing the tire rim including an annular seat confronting the annular rim shoulder between the intermediate and terminal rim flanges for receiving therein the outer margin of said inner cover member, said seat having extending therefrom a resilient portion terminating in an edge for edgewise tensioned engagement upon said shoulder means and thereby urging said cover margin in tensioned bottomed relation in said seat, said cover retaining means exerting a force urging the cover margin axially inwardly into said seat thereby enhancing the overall retaining action between the cover members.

3. In a wheel structure, a multi-flange tire rim including generally axial and radial flanges defining at their junction a shoulder and a multi-part cover including a central circular member and a radially outer annular member with lapped but separable portions bottomed on said rim shoulder, said central member having cover retaining means projecting rearwardly from the lapped portions for cover retaining engagement with said rim axial flange and said lapped portion of said annular cover member terminating radially inwardly of said rim shoulder in gripping means for gripping the central cover member between said lapped portions and said retaining means whereby the cover central and annular members are nestingly but detachably interlocked against the backing afforded by said tire rim shoulder.

4. In a wheel structure, a multi-flange tire rim including generally axial and radial flanges defining at their junction a shoulder and a multi-part cover including a central circular member and a radially outer annular member with lapped but separable portions bottomed on said rim shoulder, said central member having cover retaining means projecting rearwardly from the lapped portions for cover retaining engagement with said rim axial flange and said lapped portion of said annular cover member terminating radially inwardly of said rim shoulder in gripping means for gripping the central cover member between said lapped portions and said retaining means whereby the cover central and annular members are nestingly but detachably interlocked against the backing afforded by said tire rim shoulder, said retaining and gripping means of said cover member each comprising a serpentine-like annular edge.

5. In a wheel structure including a wheel having a multi-flanged tire rim, concentric radially outer ring and radially inner cover members nested one within the other, said ring member having an annular rim engaging shoulder on which the cover member is seated and retainingly held and resilient means on the cover member detachably and retainingly engageable with a flange of said rim and resiliently deflectable upon such engagement to draw said members together and to hold said shoulder tightly against said rim.

6. The structure of claim 5 further characterized by additional retaining means between the members being movable into augmented retaining action between the members as said resilient retaining means is engaged with said rim flange.

7. In a wheel structure including a wheel having a multi-flanged tire rim, an ornamental annular ring for disposition over said rim having radially and axially inwardly projecting spaced cover engaging terminal portions and an annular shouldered rim engaging rib between said portions and an outer edge of the ring and defining an axially outwardly opening seat, and a central cover having an outer turned edge engaged in said seat and leading into axially rearwardly extending cover retaining finger means slidably and detachably engageable with a flange of said rim, said ring terminal portions engaging said retaining means adjacent said rim flange and being forced into tight engagement therewith upon said rib bottoming on said rim.

8. In a wheel structure including a stepped multi-flanged tire rim possessed of radially inwardly facing rim flange as well as an annular rim shoulder disposed axially outwardly of the rim flange, a circular cover member having an outer marginal cover area confronting the annular rim shoulder and retaining cover structure defining an annular radially outwardly opening pocket area on the underside of the cover member cooperable with the intermediate rim flange to sustain the cover in removable assembly on the wheel, and a radially outer ring member overlying the tire rim radially outwardly of the outer marginal cover area and with the ring member having an inner underlapping marginal ring area engaged in the pocket area in underlapping relation to the outer marginal cover area and with the outer marginal cover area through the action of the retaining cover structure clamping the inner underlapping marginal ring area against the annular rim shoulder and thereby sustaining the ring member in assembly on the wheel.

9. In a wheel structure including a stepped multi-flanged tire rim possessed of an intermediate flange as well as a terminal rim flange with a radial rim flange linking the intermediate and the terminal rim flanges and an annular rim shoulder disposed at the junction of the intermediate and radial rim flanges, a circular cover member having an outer marginal cover area confronting the annular rim shoulder and retaining cover structure defining an annular radially outwardly opening pocket area on the underside of the cover member cooperable with the intermediate rim flange to sustain the cover in removable assembly on the wheel, and a radially outer ring member overlying the tire rim radially outwardly of the outer marginal cover area and with the ring member having an inner underlapping marginal ring area engaged in the pocket area in underlapping relation to the outer marginal cover area and with the outer marginal cover area through the action of the retaining cover structure clamping the inner underlapping marginal ring area against the annular rim shoulder and thereby sustaining the ring member in assembly on the wheel, said ring member having an annular arcuate area extended radially and axially outwardly of the inner marginal ring area for bridging the annular wheel balancing weight pocket area defined at the juncture of the radial and terminal rim flanges with the axially outer tip end of the terminal rim flange confronting the annular arcuate ring area.

10. In a wheel structure including a stepped multi-flanged tire rim possessed of a radially inwardly facing rim flange as well as an annular rim shoulder disposed axially outwardly of the rim flange, a circular cover member having an outer marginal cover area confronting the annular rim shoulder and retaining cover structure on the underside of the cover member cooperable with the radially inwardly facing rim flange to sustain the cover member in removable assembly on the wheel, and a radially outer ring member overlying the tire rim radially outwardly of the outer marginal cover area and with the ring member having an inner marginal ring area underlapping the outer marginal cover area and with the outer marginal cover area through the action of the retaining cover structure clamping the inner underlapping marginal ring area against the annular rim shoulder and thereby sustaining the ring member in assembly on the wheel.

11. The structure of claim 5 further characterized by said outer ring being spaced from the outermost flange edge of said tire rim and whereby the radially outer edge portion of said ring extends radially beyond and free of contact with said rim flange edge.

12. In a wheel structure including a stepped multi-flanged tire rim possessed of a radially inwardly facing rim flange as well as an annular rim shoulder disposed axially outwardly of the rim flange, a circular cover member having an outer marginal cover area confronting the annular rim shoulder and retaining cover structure on the underside of the cover member cooperable with the radially inwardly facing rim flange to sustain the cover member in removable assembly on the wheel, and a radially outer ring member overlying the tire rim radially outwardly of the outer marginal cover area and with the ring member having an inner marginal ring area underlapping the outer marginal cover area and with the outer marginal cover area through the action of the retaining cover structure clamping the inner underlapping marginal ring area against the annular rim shoulder and thereby sustaining the ring member in assembly on the wheel, said circular cover member and the ring member having thereon interengaging means so that the cover and ring members are held in unitary relation.

13. In a wheel structure including a stepped multi-flanged tire rim possessed of a radially inwardly facing rim flange as well as an annular rim shoulder disposed axially outwardly of the rim flange, a circular cover member having an outer marginal cover area confronting the annular rim shoulder and retaining cover structure on the underside of the cover member cooperable with the radially inwardly facing rim flange to sustain the cover member in removable assembly on the wheel, and a radially outer ring member overlying the tire rim radially outwardly of the outer marginal cover area and with the ring member having an inner marginal ring area underlapping the outer marginal cover area and with the outer marginal cover area through the action of the retaining cover structure clamping the inner underlapping marginal ring area against the annular rim shoulder and thereby sustaining the ring member in assembly on the wheel, said cover member having therebehind an annular shoulder and said ring member having an inner edge retainingly engaging said shoulder so that the cover and ring members are held in unitary relation.

14. In a wheel structure including a stepped multi-flanged tire rim possessed of a radially inwardly facing rim flange as well as an annular rim shoulder disposed axially outwardly of the rim flange, a circular cover member having an outer marginal cover area confronting the annular rim shoulder and retaining cover structure on the underside of the cover member cooperable with the radially inwardly facing rim flange to sustain the cover member in removable assembly on the wheel, and a radially outer ring member overlying the tire rim radially outwardly of the outer marginal cover area and with the ring member having an inner marginal ring area underlapping the outer marginal cover area and with the outer marginal cover area through the action of the retaining cover structure clamping the inner underlapping marginal ring area against the annular rim shoulder and thereby sustaining the ring member in assembly on the wheel, said retaining cover structure including a generally axially inwardly extending portion provided with circumferentially spaced gripping fingers and said inner marginal ring area having circumferentially spaced generally radially inwardly projecting portions movable axially freely of the fingers to assemble the ring member and cover member and for effecting engagement of said projecting portions with said axially inwardly extending retaining cover structure portion.

References Cited in the file of this patent

UNITED STATES PATENTS

| | | |
|---|---|---|
| 2,202,102 | Horn | May 28, 1940 |
| 2,383,071 | Mulhern | Aug. 21, 1945 |
| 2,386,235 | Lyon | Oct. 9, 1945 |
| 2,407,669 | Lyon | Sept. 17, 1946 |
| 2,413,328 | Lyon | Dec. 31, 1946 |
| 2,544,702 | Lyon | Mar. 13, 1951 |
| 2,544,703 | Lyon | Mar. 13, 1951 |
| 2,624,634 | Lyon | Jan. 6, 1953 |